(12) United States Patent
Briosi

(10) Patent No.: US 11,553,791 B2
(45) Date of Patent: Jan. 17, 2023

(54) MODULAR STRUCTURE FOR SHELVING

(71) Applicant: METALSISTEM S.P.A., Rovereto (IT)

(72) Inventor: Antonello Briosi, Rovereto (IT)

(73) Assignee: Metalsistem S.p.a., Rovereto (IT)

( * ) Notice: Subject to any disclaimer, the term of this patent is extended or adjusted under 35 U.S.C. 154(b) by 129 days.

(21) Appl. No.: 16/652,979

(22) PCT Filed: Oct. 5, 2018

(86) PCT No.: PCT/IB2018/057758
§ 371 (c)(1),
(2) Date: Apr. 1, 2020

(87) PCT Pub. No.: WO2019/069286
PCT Pub. Date: Apr. 11, 2019

(65) Prior Publication Data
US 2020/0323341 A1    Oct. 15, 2020

(30) Foreign Application Priority Data
Oct. 5, 2017   (IT) .......................... 102017000111633

(51) Int. Cl.
*A47B 47/02*    (2006.01)
*A47B 88/43*    (2017.01)
(Continued)

(52) U.S. Cl.
CPC ........ *A47B 47/028* (2013.01); *A47B 47/0058* (2013.01); *A47B 47/0083* (2013.01);
(Continued)

(58) Field of Classification Search
CPC . A47B 47/028; A47B 47/0058; A47B 91/005; A47B 96/068; A47B 96/1441; F16B 12/50
See application file for complete search history.

(56) References Cited

U.S. PATENT DOCUMENTS 4,013,022 A  *  3/1977  Walker .................. A47B 57/16
                                                  248/243
4,064,996 A  *  12/1977  Shillum ............... A47B 57/402
                                                  108/107
(Continued)

FOREIGN PATENT DOCUMENTS

EP          0421905 A1     4/1991
EP          1044632 A1    10/2000
(Continued)

*Primary Examiner* — Stanton L Krycinski
(74) *Attorney, Agent, or Firm* — David B. Tingey; Bryant J. Keller; Kirton McConkie

(57) ABSTRACT

The modular structure for shelving comprises:—a plurality of vertical uprights comprising at least one pair of first teeth arranged one on top of the other to define a first interlocking plane;—a plurality of first metal sections provided with a cross section, higher than its width, of substantially tubular and parallelepiped shape, and with two ending parts provided with corners and with one pair of first clamping elements, arranged protruding in the proximity of the corners and superimposed on one another; the first clamping elements being spaced apart from one another to be coupled from top to bottom and in block configuration to any pair of the first teeth along the first interlocking plane, each first clamping element comprising a loop defining a passage slot and each of the ending parts of the first metal sections being substantially flat.

5 Claims, 13 Drawing Sheets

(51) Int. Cl.
*A47B 47/00* (2006.01)
*A47B 57/40* (2006.01)
*A47B 91/00* (2006.01)
*A47B 96/06* (2006.01)
*A47B 96/14* (2006.01)
*F16B 12/50* (2006.01)

(52) U.S. Cl.
CPC ............ *A47B 57/406* (2013.01); *A47B 88/43* (2017.01); *A47B 91/005* (2013.01); *A47B 96/068* (2013.01); *A47B 96/1441* (2013.01); *F16B 12/50* (2013.01); *A47B 2096/1491* (2013.01)

(56) References Cited

U.S. PATENT DOCUMENTS

| | | | | |
|---|---|---|---|---|
| 4,154,419 A * | 5/1979 | Breidenbach | ........ | A47B 57/402 211/187 |
| 5,036,778 A * | 8/1991 | Briosi | ................. | A47B 57/406 211/187 |
| 5,295,446 A * | 3/1994 | Schafer | ................... | B65G 1/02 211/187 |
| 5,377,851 A * | 1/1995 | Asano | ................. | A47B 57/402 211/192 |
| 6,216,415 B1 * | 4/2001 | Briosi | ................. | A47B 57/406 52/843 |
| 6,450,350 B1 * | 9/2002 | Krummell, Jr. | ....... | A47B 47/027 211/183 |
| 6,920,831 B2 * | 7/2005 | Lin | ...................... | A47B 57/408 211/187 |
| 7,252,202 B2 * | 8/2007 | Saltzberg | ............... | A47B 57/50 211/187 |
| 9,351,567 B2 * | 5/2016 | Go | .......................... | A47B 57/22 |
| 9,474,370 B2 * | 10/2016 | Troyner | ............... | A47B 47/027 |
| 9,661,921 B1 * | 5/2017 | Tsai | ...................... | A47B 57/50 |
| 10,299,589 B1 * | 5/2019 | Lai | ..................... | A47B 96/1441 |
| 11,219,308 B2 * | 1/2022 | Globerman | .......... | A47B 57/406 |
| 2002/0195410 A1 * | 12/2002 | Lin | ........................ | A47B 57/16 211/187 |
| 2006/0144809 A1 * | 7/2006 | Collins | ................. | A47B 57/406 211/191 |
| 2008/0047474 A1 * | 2/2008 | Scholz | ................... | A47B 57/40 108/180 |
| 2011/0042336 A1 * | 2/2011 | Cheng | ................... | A47B 96/02 211/153 |
| 2017/0238710 A1 * | 8/2017 | Tsai | ...................... | A47B 57/34 |
| 2017/0280875 A1 * | 10/2017 | Buckley | ................ | A47B 57/40 |

FOREIGN PATENT DOCUMENTS

FR 2124737 A5 9/1972
FR 2450583 A1 10/1980

\* cited by examiner

Fig.4
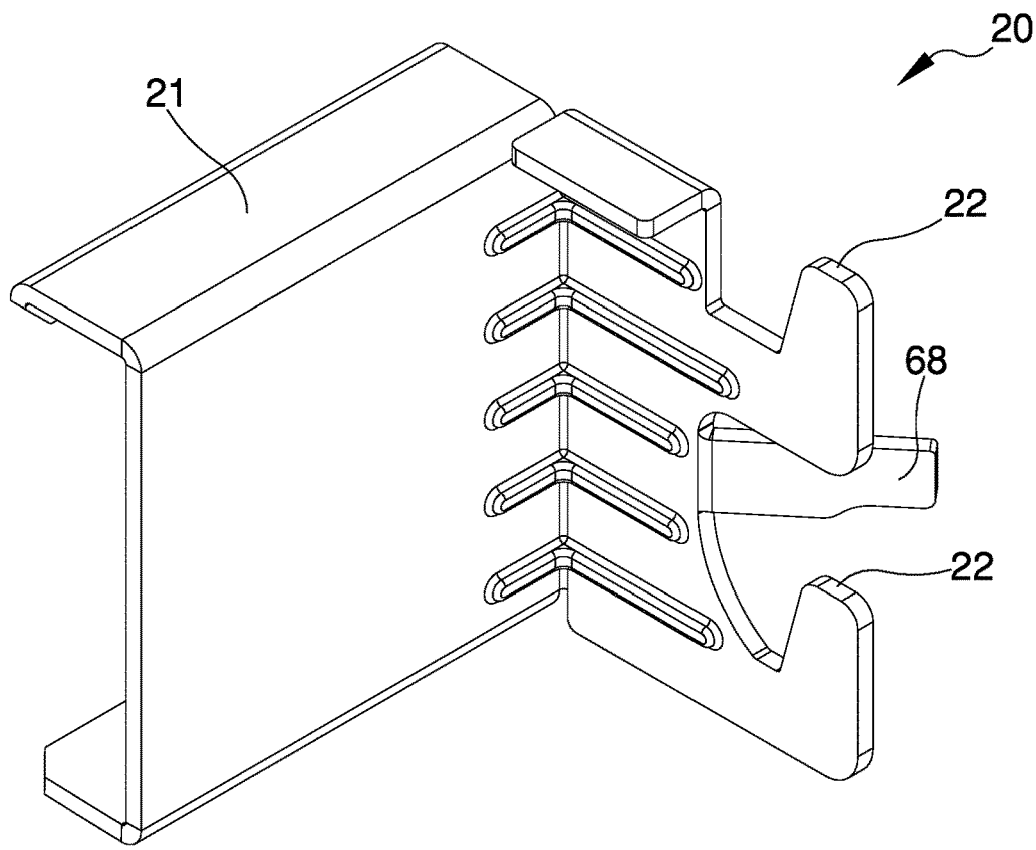
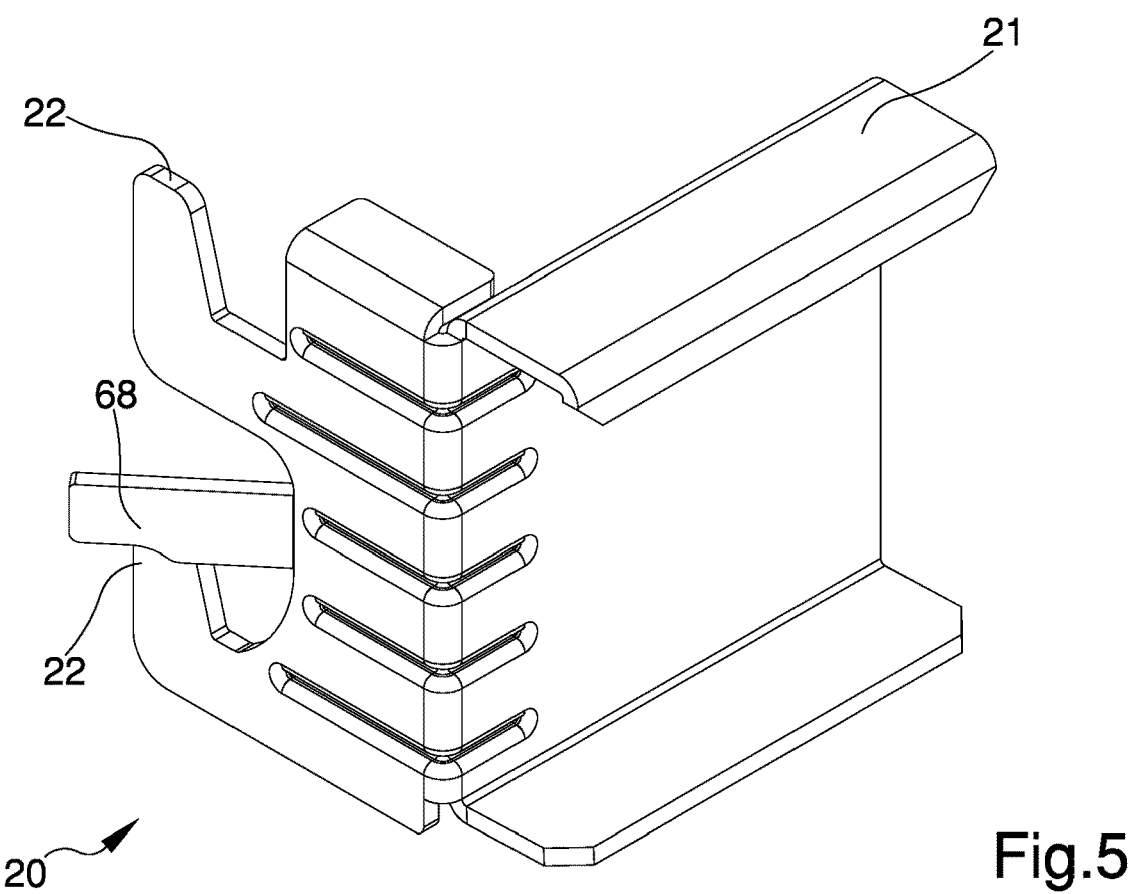
Fig.5

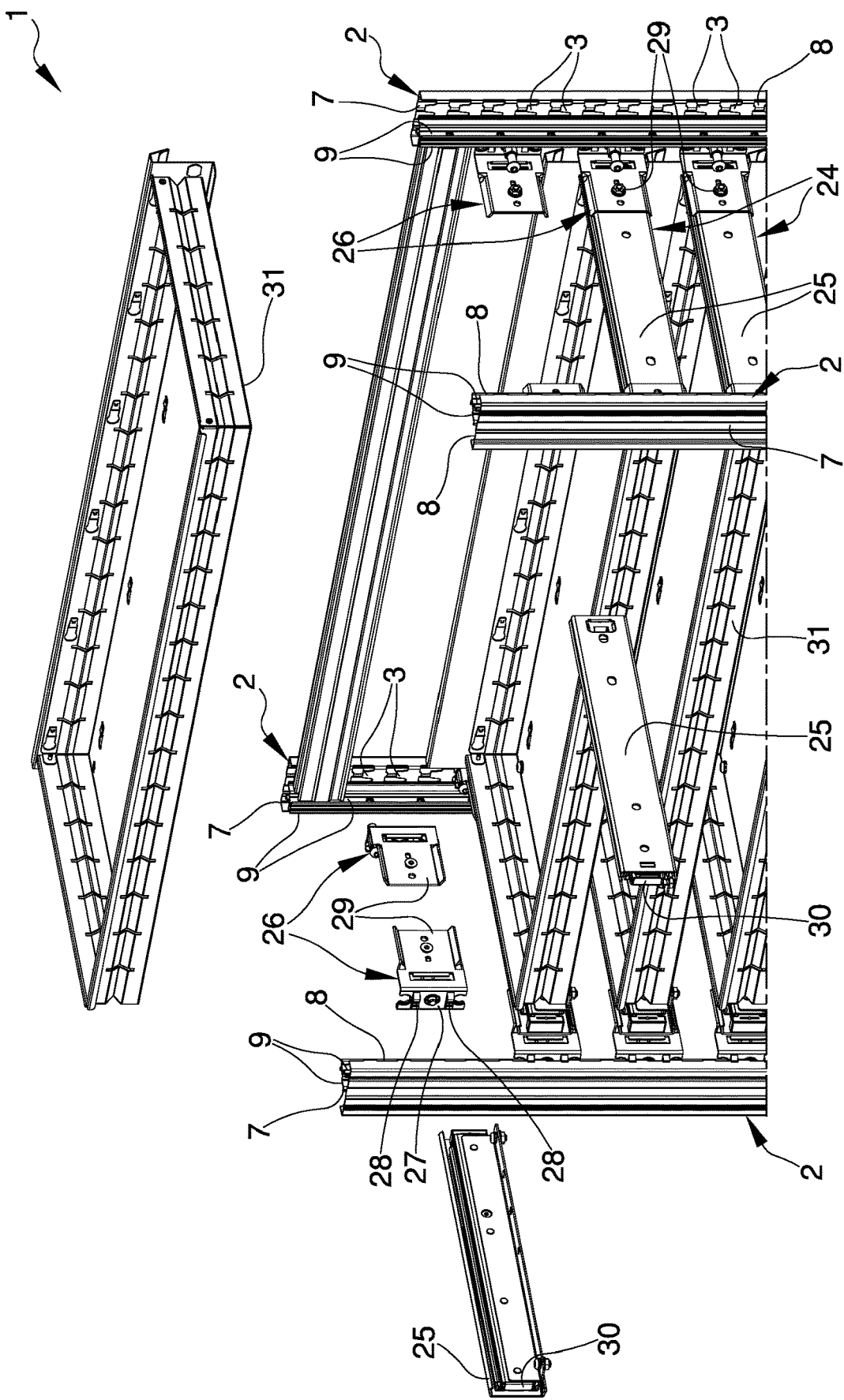

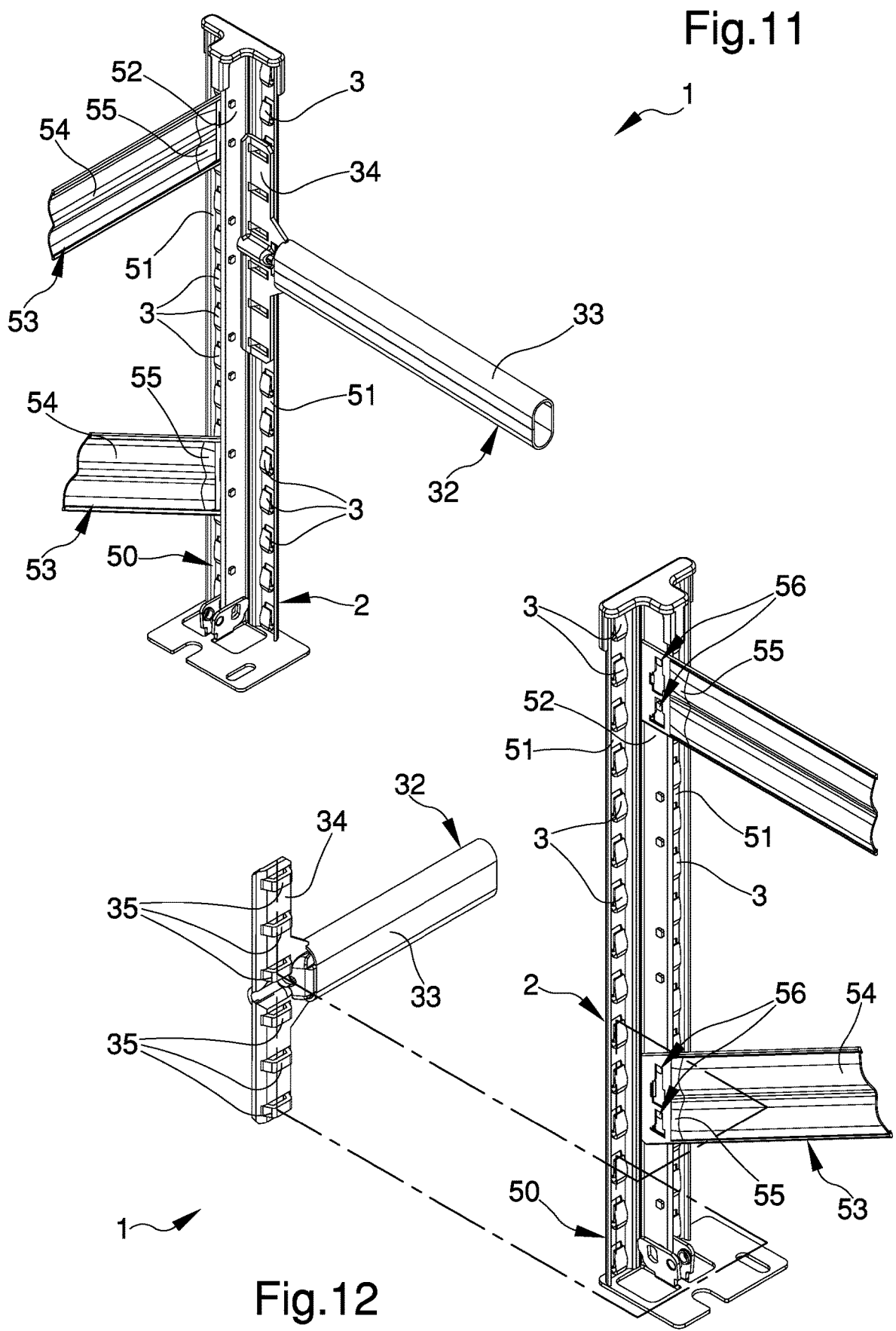

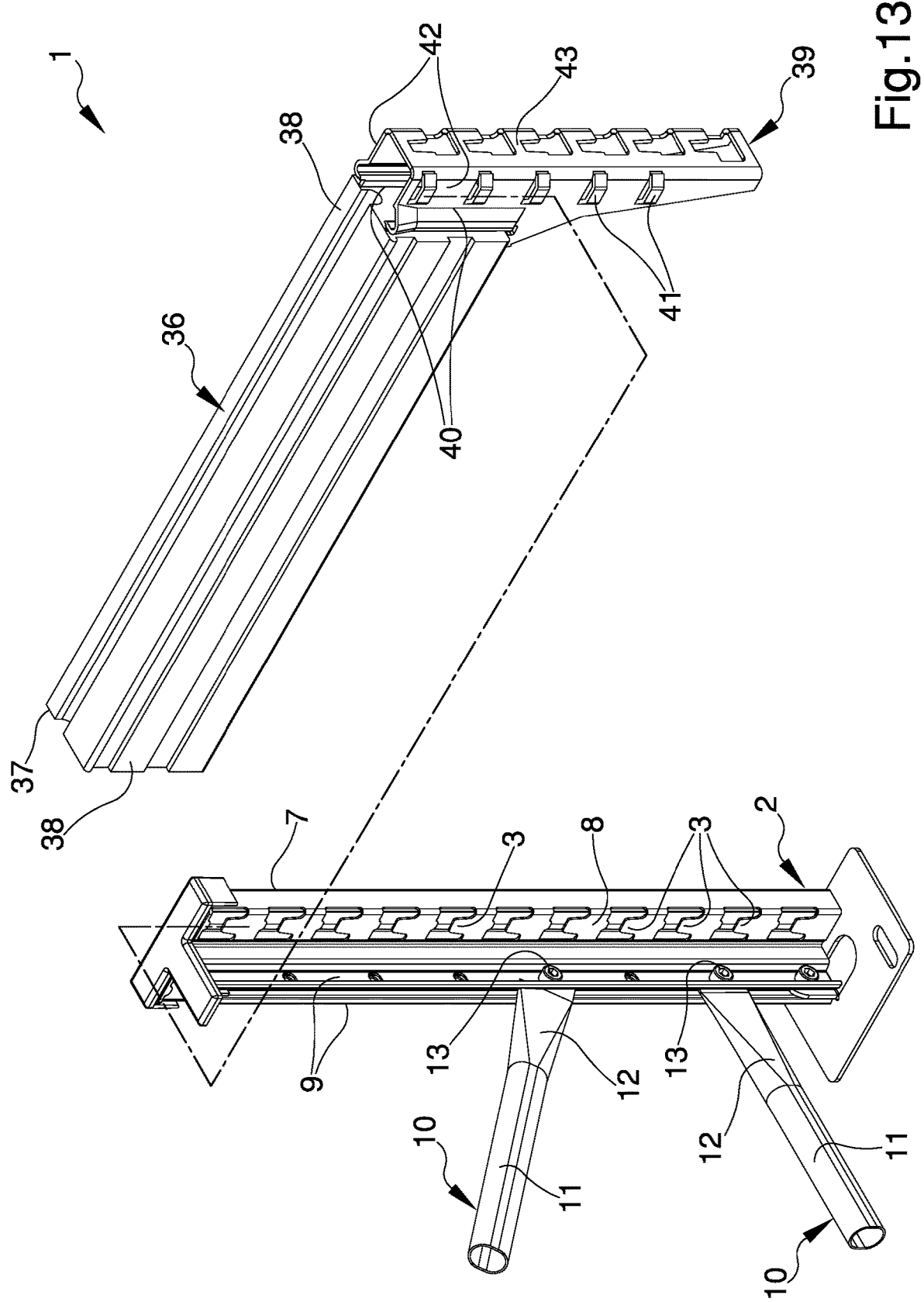

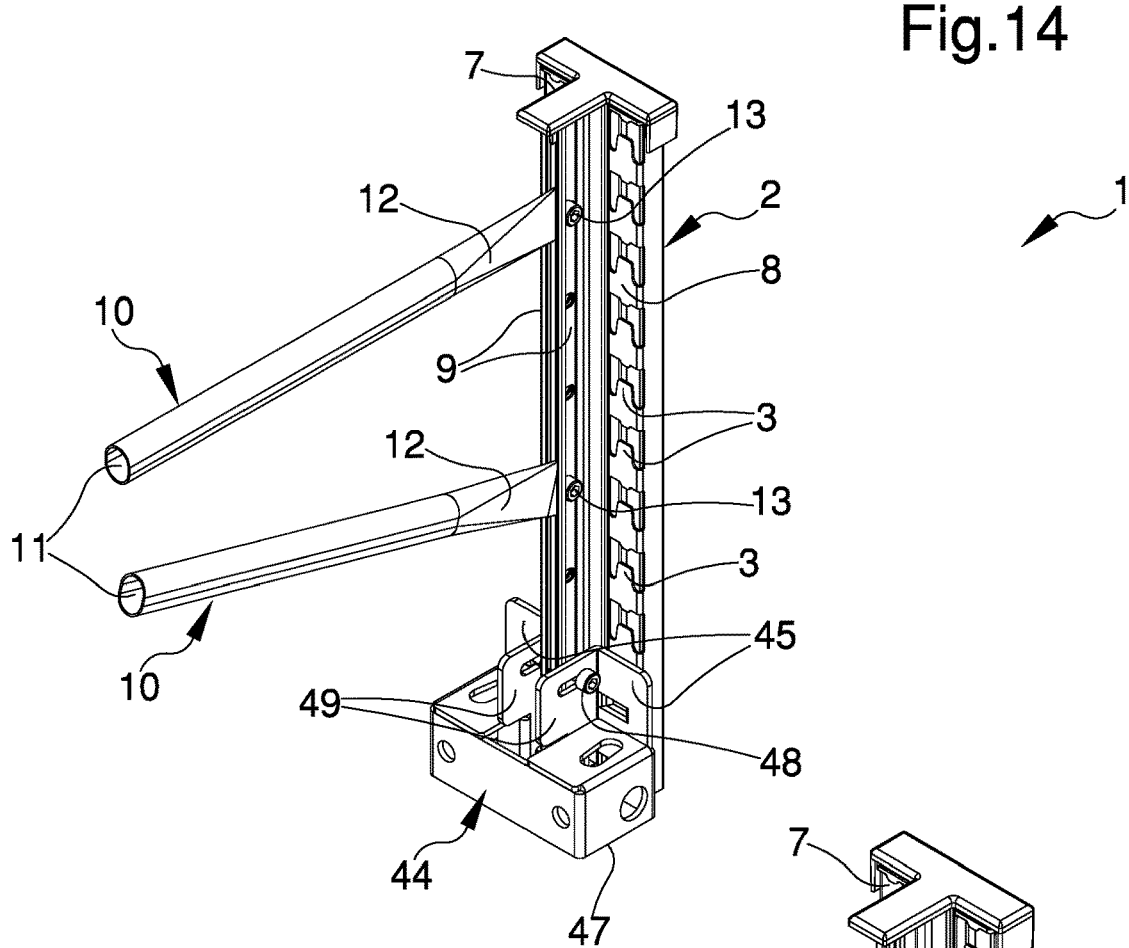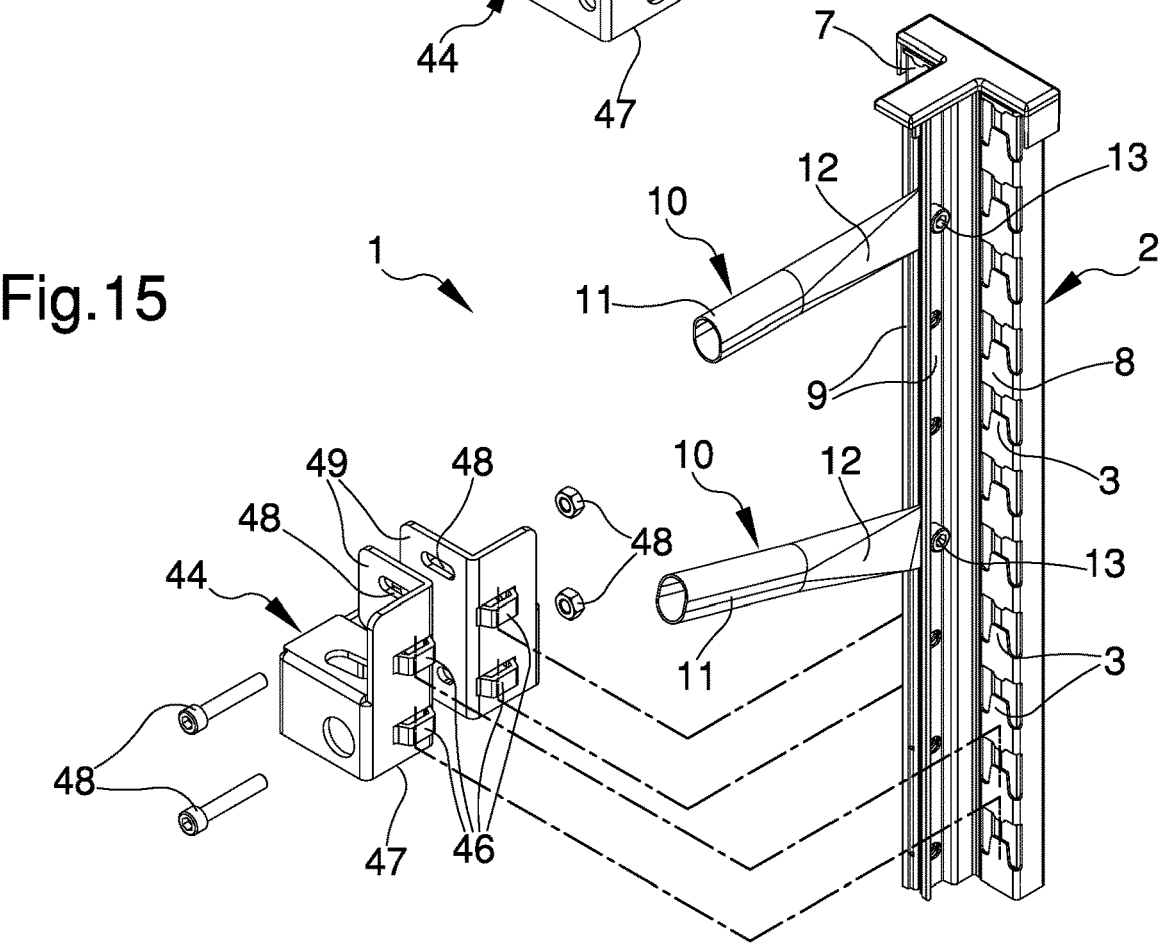

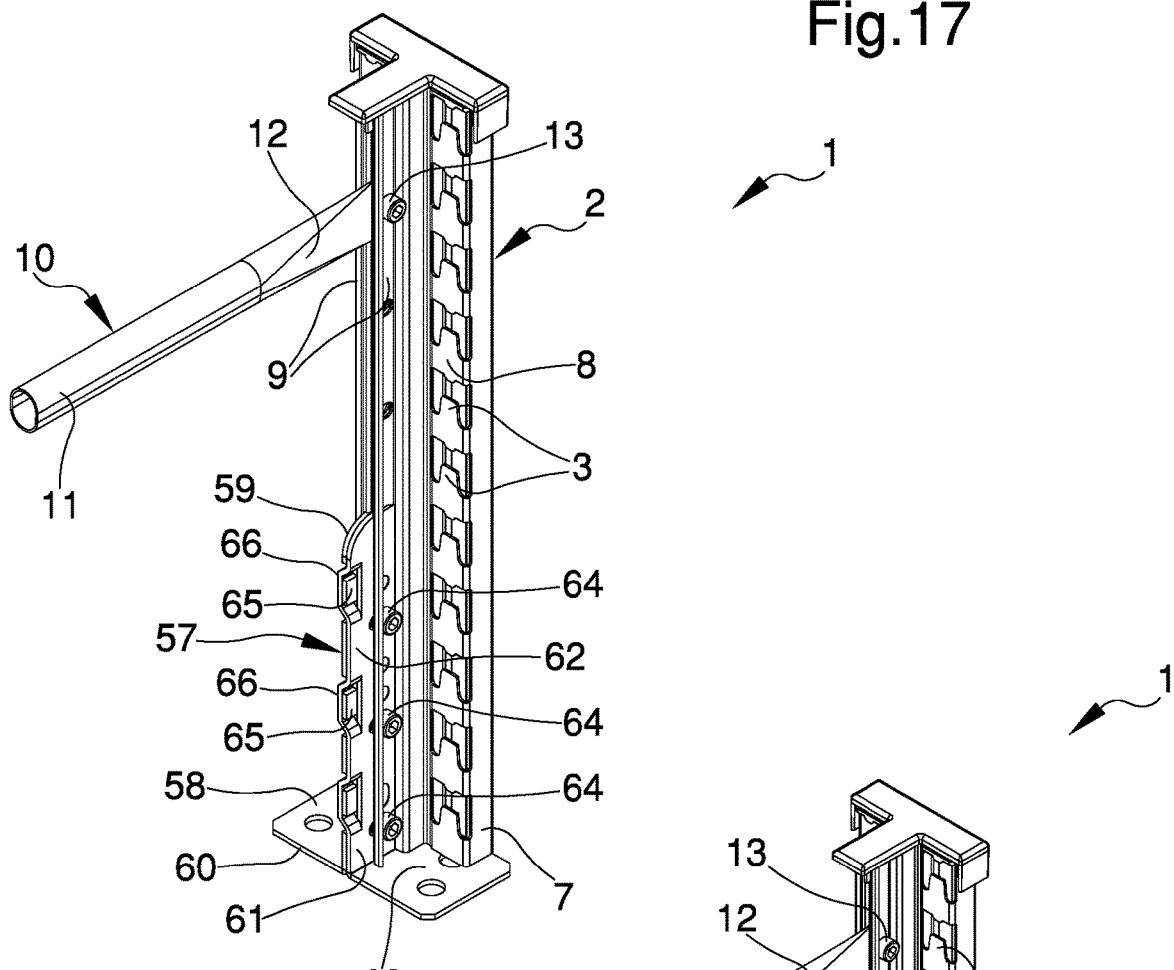
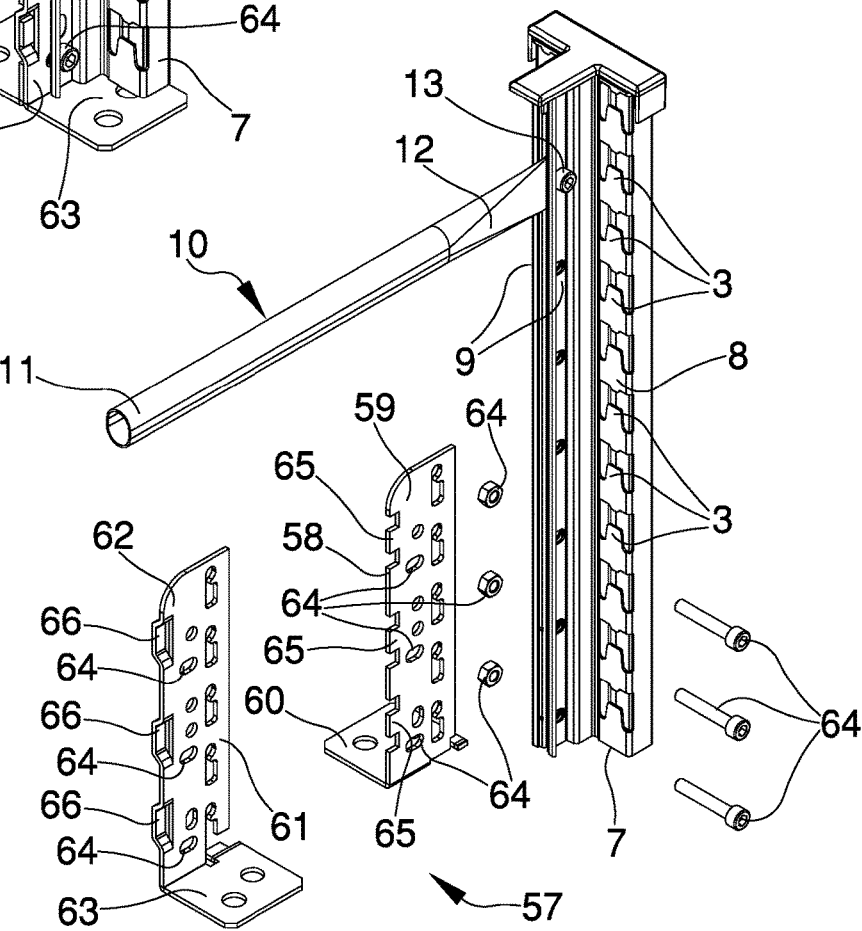

MODULAR STRUCTURE FOR SHELVING

TECHNICAL FIELD

The present invention relates to a modular structure for shelving.

BACKGROUND ART

Various modular structures for shelving are known which stand out for their assembly techniques, the degree of modularity of the structure and the maximum capacity of the shelving made.

Structures of known type employ vertical uprights as a support base on a stable surface and longitudinal cross-pieces whereon a plurality of horizontal walkways rest thereby forming a plurality of tops of the shelving.

Specifically, the vertical uprights are provided with a plurality of teeth arranged longitudinally, one after the other, along the body of the upright itself.

The longitudinal cross-pieces comprise two ending parts, each of which is provided with a pair of clamping elements adapted to engage any pair of teeth of the vertical upright thus being obtained a stable coupling between the vertical upright and the longitudinal cross-piece.

Advantageously, the vertical uprights and the longitudinal cross-pieces have longitudinal metal sections of different lengths so as to allow obtaining structures of varying height and width depending on the spaces to be occupied and on the load to be supported by the shelving.

Specifically, known modular structures employ a plurality of vertical uprights which are arranged resting on a stable surface and spaced apart from each other.

In addition, between each pair of vertical uprights a plurality of longitudinal cross-pieces is interposed to provide a stable supporting structure for the tops of the shelving.

The number of vertical uprights used to make the modular structure substantially defines the length thereof, while the number of cross-pieces is indicative of the number of tops arranged between the vertical uprights of the structure.

Structures of known type are susceptible, however, to improvements depending on the flexibility with which the modular structure itself adapts to take up at best spaces and environments having different dimensions and needs.

For example, modular structures of the known type do not allow obtaining stable modular structures of the angular type which are adapted to the angle formed by two contiguous walls of a room.

DESCRIPTION OF THE INVENTION

The main aim of the present invention is to devise a modular structure for shelving which allows manufacturing stable shelving also of the angular type.

Another object of the present invention is to devise a modular structure for shelving which allows manufacturing mobile shelving which can be dynamically moved by a user.

An additional object of the present invention is to devise a modular structure for shelving which allows to specifically reinforcing a number of shelving in order to increase their capacity and stability according to need.

Another object of the present invention is to devise a modular structure for shelving that allows manufacturing shelving which, the length being the same, have a greater capacity and stability and which, the capacity and stability being the same, are longer than those of the known type.

Another object of the present invention is to devise a modular structure for shelving having a high degree of modularity to best adapt to different needs in terms of occupied space and maximum capacity guaranteed by the structure.

The aforementioned objects are achieved by the present modular structure for shelving having the characteristics of claim 1.

BRIEF DESCRIPTION OF THE DRAWINGS

Other characteristics and advantages of the present invention will become more evident from the description of a preferred, but not exclusive embodiment of a modular structure for shelving, illustrated by way of an indicative, but non-limiting example, in the attached drawings in which:

FIG. 4 is an axonometric view of a second element of the modular structure for shelving according to the invention;

FIG. 5 is an axonometric view of the element of FIG. 4 from another perspective;

FIG. 10 is an axonometric view of the first embodiment of the modular structure according to the invention with further elements;

FIG. 11 is an axonometric view of a first portion of the second embodiment of the modular structure according to the invention;

FIG. 12 is an axonometric view of an exploded view of the portion of FIG. 11;

FIG. 13 is an axonometric view of an exploded view of a second portion of the first embodiment of the modular structure according to the invention;

FIG. 14 is an axonometric view of a third portion of the first embodiment of the modular structure according to the invention;

FIG. 15 is an axonometric view of an exploded view of the portion of FIG. 14;

FIG. 17 is an axonometric view of a fourth portion of the first embodiment of the modular structure according to the invention;

FIG. 18 is an axonometric view of an exploded view of the portion of FIG. 17.

EMBODIMENTS OF THE INVENTION

Figure 1:
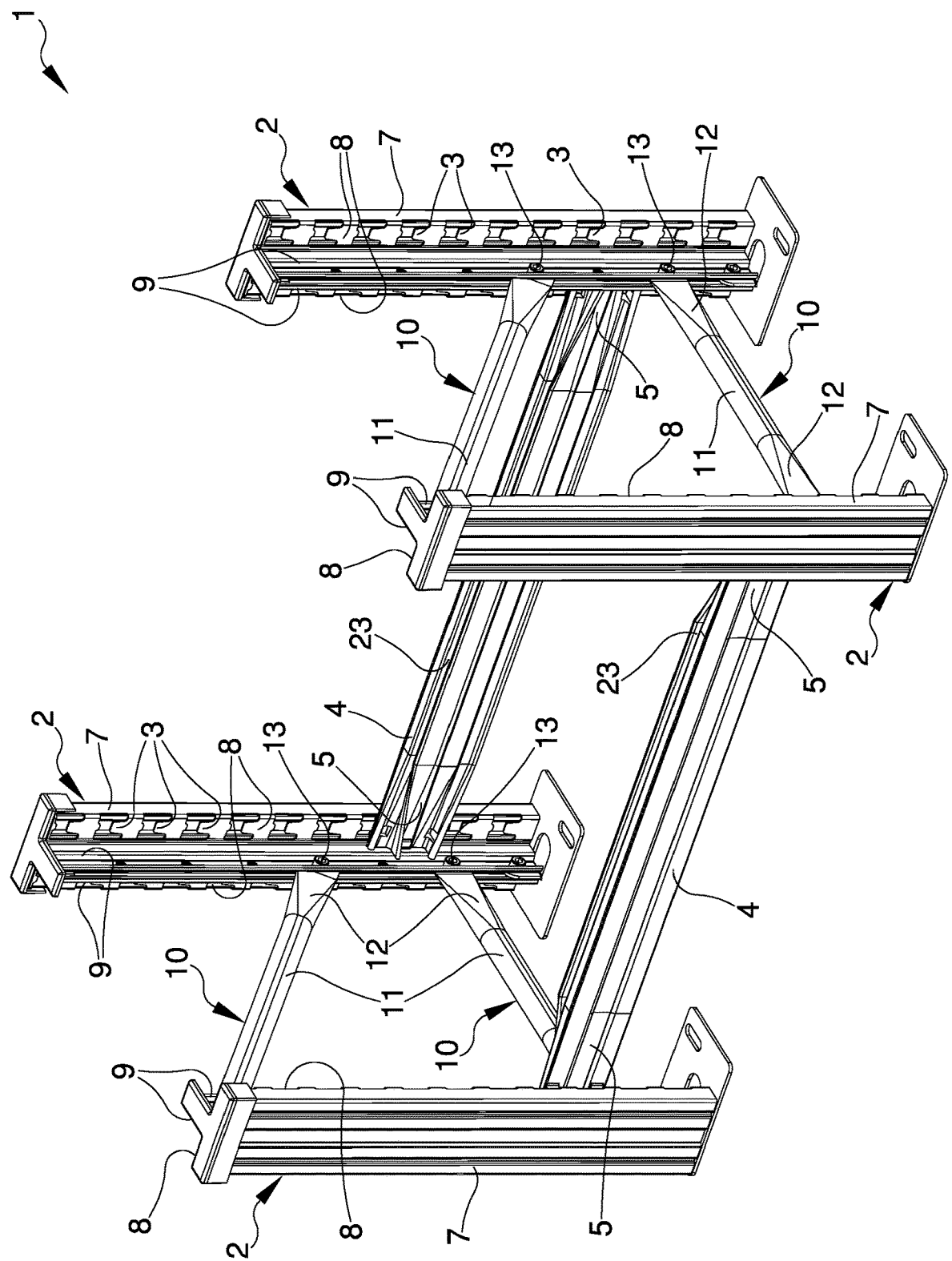
FIG. 1 is an axonometric view of a first embodiment of the modular structure for shelving according to the invention.
Figure 3:
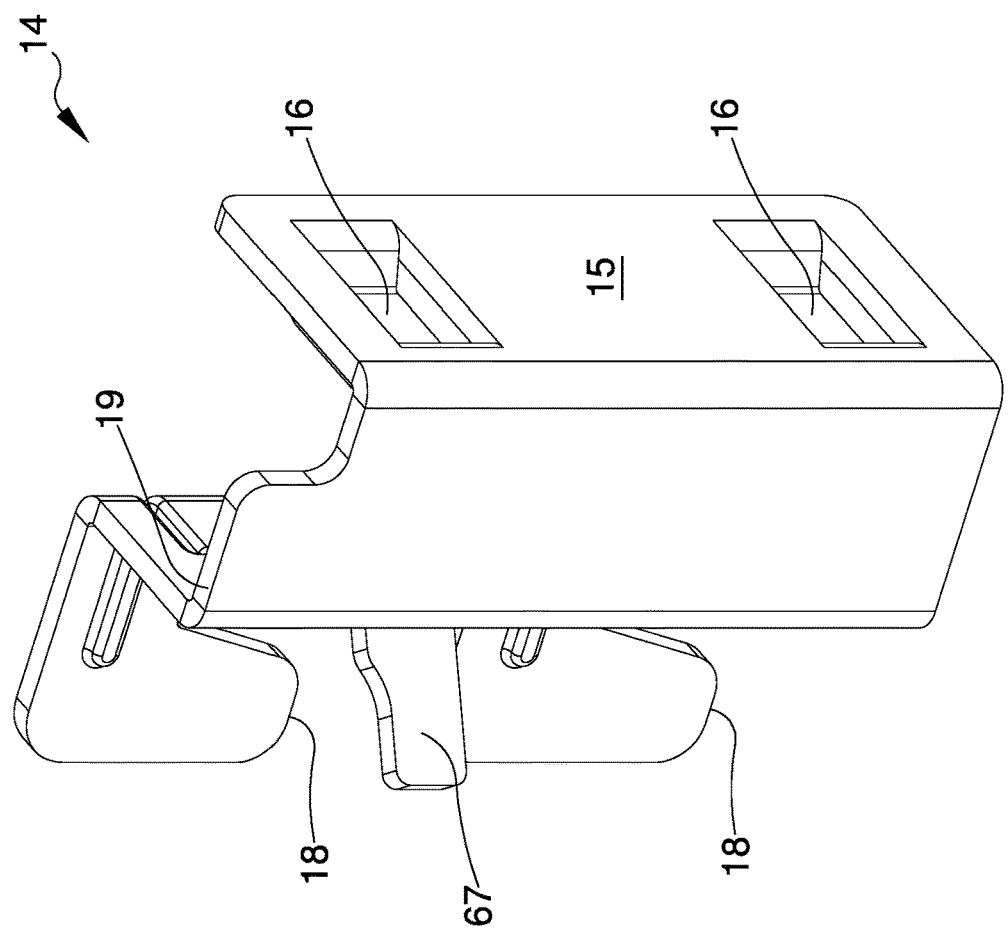
FIG. 3 is an axonometric view of the element of FIG. 2 from another perspective.
Figure 2:
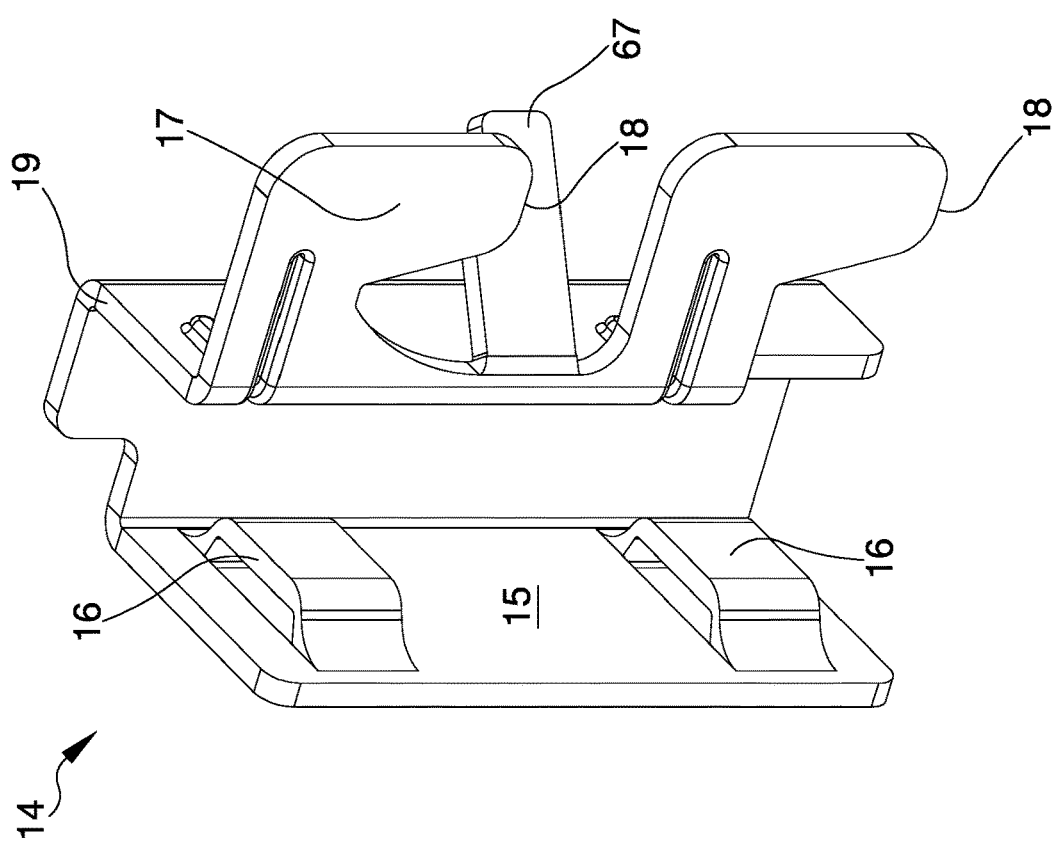
FIG. 2 is an axonometric view of a first element of the modular structure for shelving according to the invention.

With particular reference to these figures, reference numeral 1 globally indicates a modular structure for shelving.

The modular structure 1 for shelving comprises:
- a plurality of vertical uprights 2 which comprise at least one pair of first teeth 3 arranged one on top of the other and defining a first interlocking plane A;
- a plurality of first metal sections 4 provided with a cross section, higher than its width and of substantially tubular and parallelepiped shape, and with two ending parts 5 provided with corners and with one pair of first clamping elements 6, arranged protruding in the proximity of the corners and superimposed on one another.

The first clamping elements 6 are spaced apart from one another and configured to be coupled, in block configuration, to engage from top to bottom, any pair of the first teeth 3 along the first interlocking plane A to manufacture modular structures and/or similar structures, wherein each the first clamping element 6 comprises a loop defining a passage slot and each of the ending parts 5 of the first metal sections 4 is substantially flat.

The vertical upright 2 is arranged in a vertical position resting on a stable surface, for example on the ground, and extends longitudinally in height thereby forming the base whereon all the elements that make up the modular structure 1 are resting.

Advantageously, the first teeth 3 are substantially flat foil portions and made of the same foil which makes up the body of the vertical upright 2.

In addition, the first teeth 3 have a substantially trapezoidal shape and are arranged one on top of the other along the entire vertical extension of the vertical upright 2 to form a sequence of identical hooks, each of which is turned upwards to pass through the loop of the corresponding first clamping element 6.

Advantageously, the first clamping elements 6 are foil portions, substantially curved in shape to define the corresponding loop, and made of the same foil which makes up the body of the first metal section 4.

The vertical upright 2 comprises a vertical metal section 7 provided with at least one pair of first vertical faces 8 and with at least one pair of second vertical faces 9 substantially parallel to one another and transverse to the pair of first vertical faces 8, at least one pair of first teeth 3 being arranged vertically along at least one of the first vertical faces 8.

Advantageously, the first vertical faces 8 are arranged substantially coplanar to each other and associated, contiguously and orthogonally, to one of the second vertical faces 9 respectively.

The vertical metal section 7 is, therefore, provided with a substantially T-shaped cross section.

Furthermore, along each first vertical face 8 a plurality of pairs of first teeth 3 are made as shown in FIG. 1.

A plurality of first metal sections 4 can be attached to each first vertical face 8.

More precisely, each ending part 5 of each first metal section 4 is attached to a first vertical face 8 of two separate vertical metal sections 7 respectively, substantially forming a junction crosspiece between two vertical uprights 2.

The modular structure 1 comprises a first bracing element 10 comprising:
at least a third longitudinal and tubular metal section 11, provided with a cross section higher than its width and with at least one pair of substantially flat ending parts 12 and to be attached to the vertical metal section 7; and
first fastening means 13 of the ending parts 12 to the pair of second vertical faces 9.

Advantageously, the cross section of the first bracing element 10 is of substantially circular shape and the ending parts 12 are substantially flat to fit between the second vertical faces 9 of the vertical upright 2 so as to be fastened to the vertical metal section 7 by means of the first fastening means 13.

More in detail, the first fastening means 13 comprise two first holes formed on the ending parts 12 respectively and a plurality of second holes obtained sequentially, one on top of the other, along the entire vertical extension of the second vertical faces 9.

Each second hole formed on a second vertical face 9 is substantially facing and concentrically opposed to another second hole formed on the other second vertical face 9.

This way, the first hole of each ending part 12 is interposed substantially concentrically between a pair of second holes and is fastened to the vertical upright 2 by means of the first fastening means 13.

The first fastening means 13 comprise a plurality of screws, each passing through a pair of second holes and a corresponding first hole, and a plurality of nuts, each being screwed to a corresponding screw to fasten an ending part 12 together with a pair of second vertical faces 9.

Advantageously, each ending part 12 of each first bracing element 10 is attached to a corresponding pair of second vertical faces 9 of a vertical upright 2.

In addition, since the second holes are made along the entire length of the vertical uprights 2, the first bracing element 10 can be attached to the second vertical faces 9 in different positions according to the needs.

More in detail, each first bracing element 10 is substantially transverse to the first interlocking plane A and orthogonal to each first metal section 4 thus forming a substantially stable modular structure 1, that is capable of steadily supporting variable structural loads without the vertical uprights 2, the first metal sections 4 and the bracing elements 10 being deformed thus compromising the reliability of the modular structure 1 itself.

The modular structure 1 can be made stable with four vertical uprights 2 between which a plurality of first metal sections 4 are interposed, which are arranged substantially opposite and parallel to each other at the respective first interlocking planes A, and a plurality of first bracing elements 10, substantially transverse to the first interlocking planes A, as shown in FIG. 1.

On the modular structure 1 thus obtained, a plurality of tops resting between the first metal sections 4 can be mounted, for example, so as to provide a plurality of supporting surfaces interposed between the vertical uprights 2 to form a shelving.

The shelving made with the modular structure according to the invention can remain stable in support by means of the vertical uprights 2, which vertical uprights, operating in conjunction with the first metal sections 4 and the first bracing elements 10, give stability to the shelving even if the latter is subjected to traction and/or twist by the loads placed on the supporting surfaces.

The modular structure 1 also comprises at least a first angular bracket 14 comprising:
at least a first flat terminal portion 15 comprising one pair of second clamping elements 16 which are arranged protruding and superimposed on one another, the second clamping elements 16 being spaced apart from one another and configured to be coupled in block configuration to engage, from top to bottom, any pair of the first teeth 3 along the first interlocking plane A; and
at least a second flat terminal portion 17 comprising one pair of second teeth 18 arranged in sequence one on top of the other to define a second interlocking plane B substantially orthogonal to the first interlocking plane A.

The first clamping elements 6 are configured to be coupled in block configuration to engage, from top to bottom, any pair of second teeth 18 along the second interlocking plane B.

Advantageously, the second clamping elements 16 are substantially identical in shape and size with respect to the first clamping elements 6, while the pair of second teeth 18 is a pair of two substantially identical foil portions and substantially formed from the same foil the body of the first angular bracket 14 is made of.

In particular, the second teeth 18 are two curved foil portions forming substantially a pair of hooks having a substantially flat shape and substantially coplanar with respect to the second terminal portion 17.

Advantageously, the first angular bracket 14 comprises an angular portion 19 interposed between the first terminal portion 15 and the second terminal portion 17.

Specifically, the angular portion 19 is a foil portion comprising two flat stretches bent substantially at 90° to each other and associated with the first terminal portion 15 and the second terminal portion 17, respectively.

Figure 6:
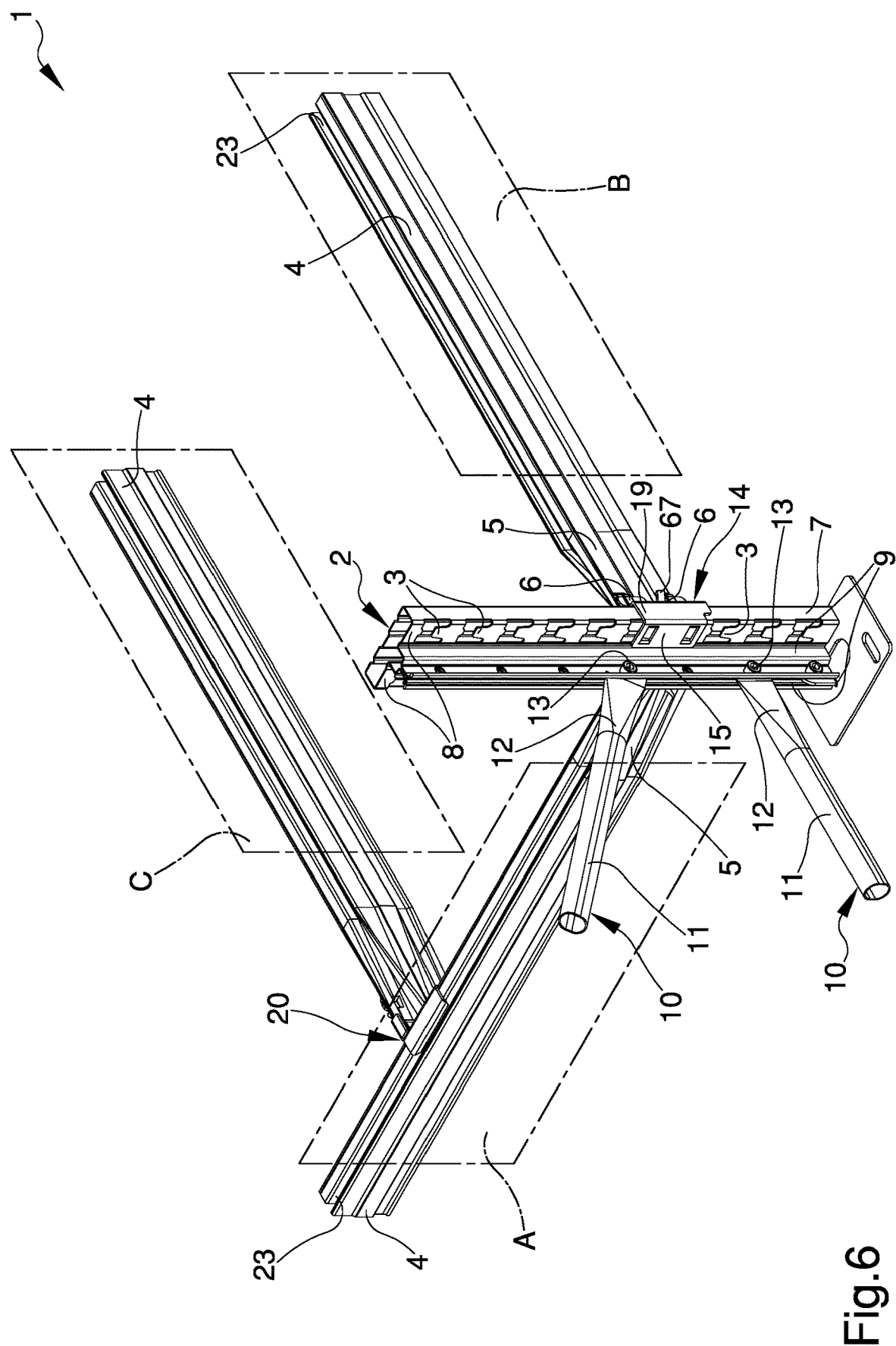
FIG. 6 is an axonometric view of a first portion of the first embodiment of the modular structure according to the invention.
Figure 7:
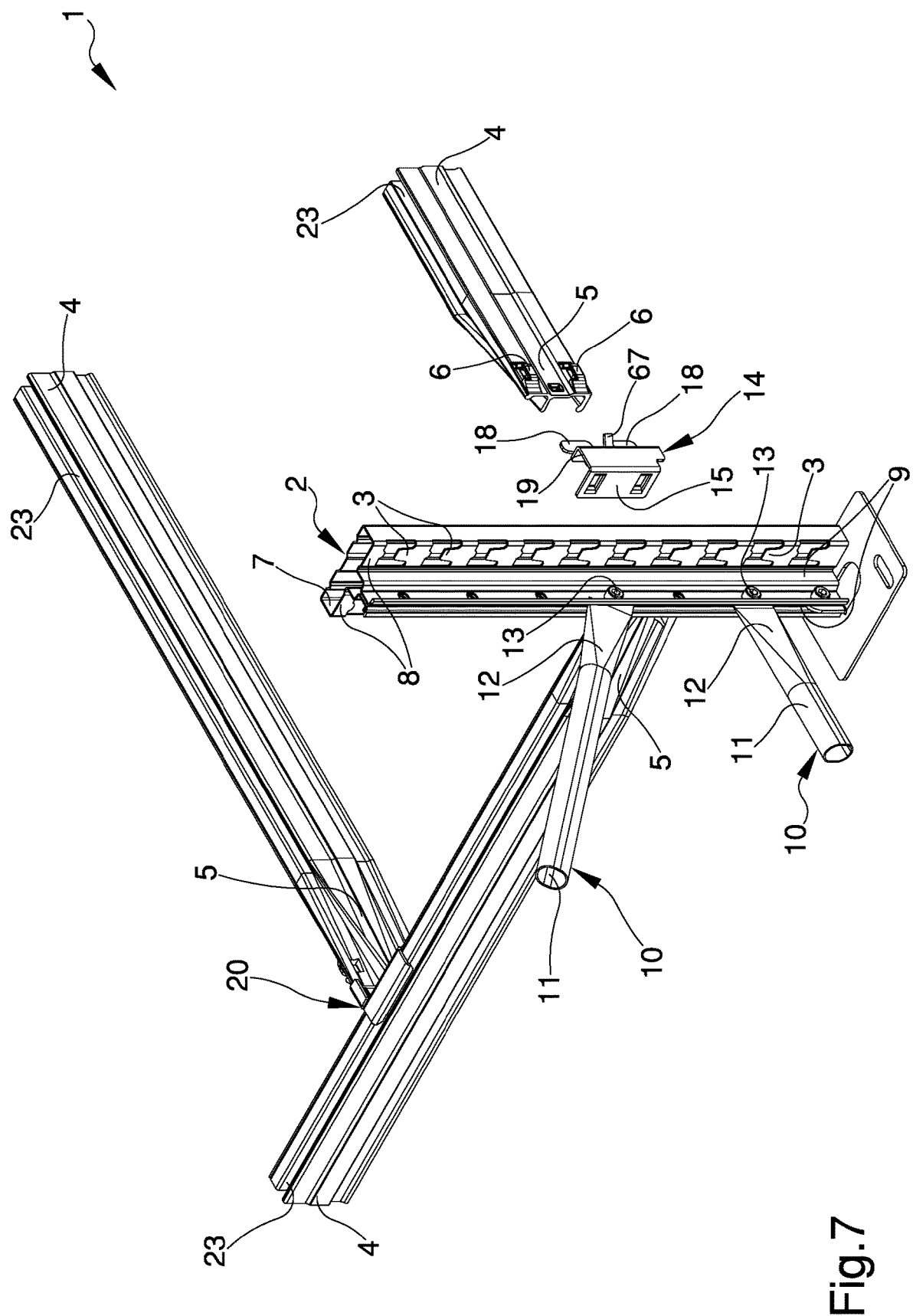
FIG. 7 is an axonometric view of a first exploded view of the portion of FIG. 6.
Figure 8:
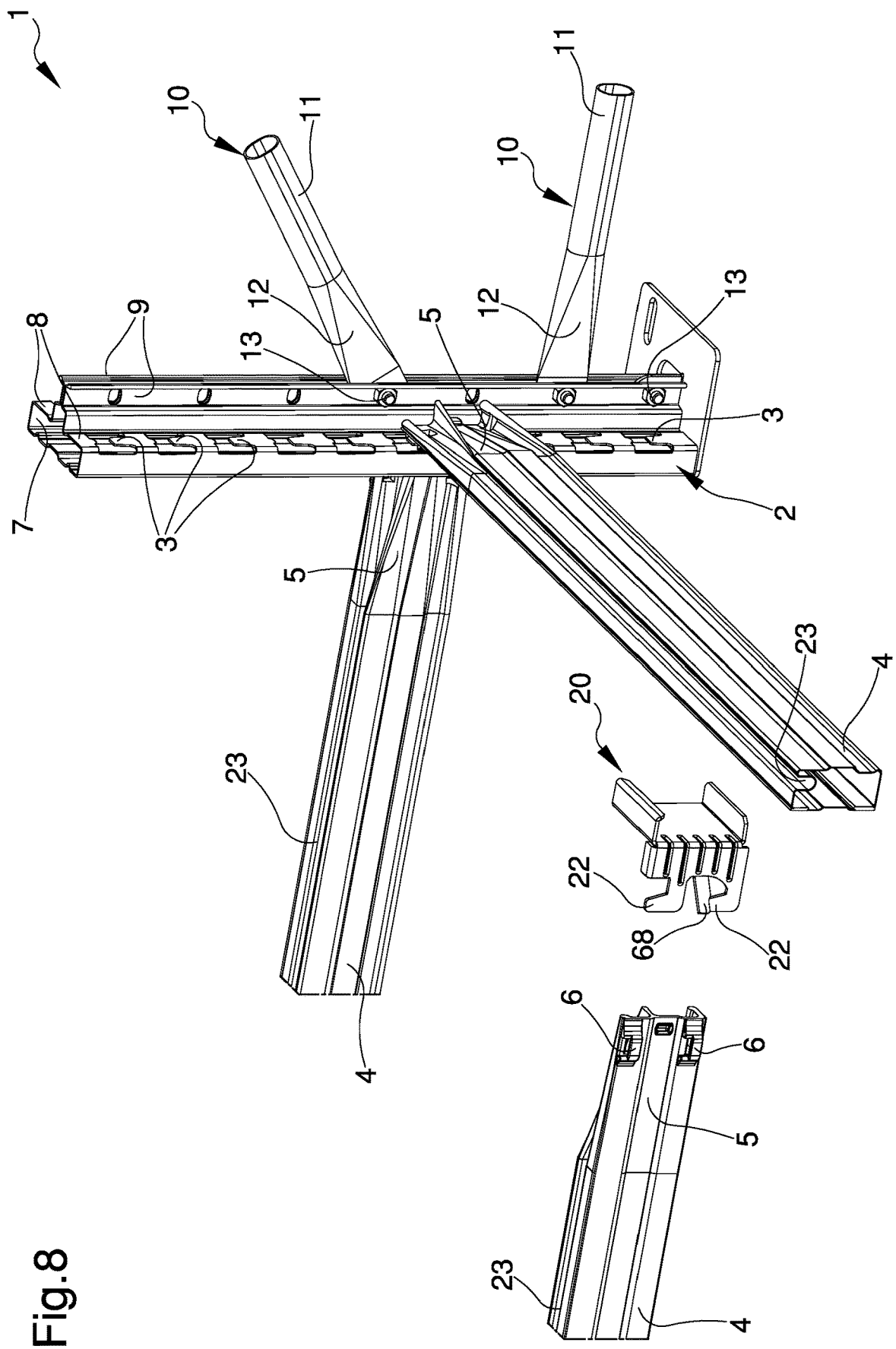
FIG. 8 is an axonometric view of a second exploded view of the portion of FIG. 6.

Conveniently, the two flat stretches are substantially flat in shape so as to face in support the body of the vertical upright 2 and arrange the second terminal portion 17 substantially on the opposite side of the vertical metal section 7 with respect to where the first terminal portion 15 is attached, as shown in FIG. 6.

Preferably, the first angular bracket 14 comprises a first anti-release tab 67, with a flat and elongated shape, arranged on the second terminal portion 17.

The first tab 67 is arranged between the second teeth 18 along a plane substantially transverse to the second interlocking plane B.

Advantageously, the first angular bracket 14 comprises a weakened rectilinear stretch which is interposed between the second terminal portion 17 and the first tab 67.

This way, the first tab can be manually rotated along the weakened rectilinear stretch of the first angular bracket 14.

The modular structure 1 also comprises at least a second angular bracket 20 comprising:
  attachment means 21 to the first metal section 4, the attachment means 21 sliding longitudinally along the first metal section 4; and
  at least one pair of third teeth 22 arranged in sequence one on top of the other to define a third interlocking plane C substantially orthogonal to the first interlocking plane A.

The first clamping elements 6 are configured to be coupled in block configuration to engage, from top to bottom, any pair of third teeth 22 along the third interlocking plane C.

Preferably, the attachment means 21 comprise a flat foil portion provided with two substantially opposed side fins and facing each other and substantially orthogonal to the flat foil portion.

Advantageously, one of the side fins comprises an attachment stretch adapted to become attached onto the body of the first metal section 4.

The side fins, operating in conjunction with the flat foil portion, give to the attachment means 21 a substantially C-shaped cross section adapted to at least partly fit the first metal section 4 in a prismatic manner.

The first metal section 4 comprises, in fact, a longitudinal groove 23 which is attached to the stretches of the attachment means 21.

Advantageously, the longitudinal groove 23 allows guiding the attachment stretch which slides longitudinally along the first metal section 4.

This way, the second angular bracket 20 is attached to the first metal section 4 and at the same time can slide longitudinally along substantially the entire length of the first metal section 4.

Conveniently, the third teeth 22 are substantially identical to the second teeth 18 and are associated orthogonal to the flat foil portion of the attachment means 21, so as to define the third interlocking plane C substantially orthogonal to the sliding direction of the angular bracket 20.

Preferably, the second angular bracket 20 comprises a second anti-release tab 68, with a flat and elongated shape, and arranged on the attachment means 21.

Specifically, the second tab 68 is arranged between the third teeth 22 along a plane substantially transverse to the third interlocking plane C.

Advantageously, the angular bracket 20 comprises a weakened rectilinear stretch which is interposed between the attachment means 21 and the second tab 68.

This way, the second tab 68 can be manually rotated along the weakened rectilinear stretch of the second angular bracket 20.

The modular structure 1 also comprises a sliding support 24 comprising:
  at least one fixed element 25 to be attached to a pair of vertical uprights 2, respectively;
  at least one pair of attachment brackets 26 of the fixed element 25 to a corresponding pair of vertical uprights 2 and comprising at least one flat terminal body 27 provided with at least one pair of third clamping elements 28 arranged protruding and superimposed on one another;
  clamping means 29 of the element 25 to the attachment brackets 26; and
  at least one sliding element 30 which is hinged sliding longitudinally to the fixed element 25 and associable with at least one supporting member 31.

The third clamping elements 28 are spaced apart from each other and configured to be coupled in block configuration to engage, from top to bottom, any pair of first teeth 3 along the first interlocking plane A.

Preferably, the fixed element 25 and the sliding element 30 are two hinged longitudinal metal crosspieces sliding relative to each other and to be arranged substantially horizontally between two vertical uprights 2 by means of the pair of attachment brackets 26.

Advantageously, the sliding support 24 comprises a first longitudinal guide formed on the fixed element 25, a second longitudinal guide, formed on the sliding element 30 and prismatically insertable inside the first longitudinal guide, and a plurality of small balls interposed between the first and second longitudinal guide and rotating under the effect of dragging of at least one of the fixed element 25 and the sliding element 30 to allow sliding of one with respect to the other.

Alternative embodiments cannot be ruled out wherein the sliding of the sliding element 30 with respect to the fixed element 25 is implemented in a different manner, e.g. by means of ball bearings.

Advantageously, each attachment bracket 26 comprises a flat portion which is associated contiguously and substantially orthogonally with the terminal body 27 to form with the latter an angle of 90° and adapted to be attached to the fixed element 25 by means of the clamping means 29.

The clamping means 29 comprise a first slot formed on the flat portion of each attachment bracket 26 and a pair of second slots formed at the ending parts of the fixed element 25, respectively.

In addition, the clamping means 29 comprise a plurality of screws, each being passing through a first slot and a second slot, and a plurality of nuts screwable to the respective screws to lock the fixed element 25 to a pair of attachment brackets 26.

The modular structure 1 according to the invention also comprises at least one stabilizing bar 32 comprising:
- at least a second longitudinal metal section 33 provided with a cross section higher than its width and with a pair of ending parts; and
- at least one pair of vertical brackets 34, associated with one of the second ending parts respectively, substantially higher than the second metal section 33 and provided with a plurality of fourth clamping elements 35 arranged protruding and superimposed on one another.

The fourth clamping elements 35 are spaced from one another and configured to be coupled in block configuration to engage, from top to bottom, a plurality of first teeth 3 along the first interlocking plane A.

Preferably, the second metal section 33 is a metal tubular element adapted to attach between two vertical uprights 2 to increase the stability of the modular structure 1.

Advantageously, the vertical brackets 34 are flat foils substantially orthogonal to the second metal section 33 and facing a first vertical face 8 of a vertical upright 2 respectively, so as to attach the fourth clamping elements 35 to the first teeth 3.

Specifically, each vertical bracket 34 comprises a plurality of pairs of fourth clamping elements 35 so as to become attached to more than one pair of first teeth 3 and to secure a wider portion of each vertical upright 2 with respect to the portion secured by a first section metal 4, so as to ensure more stability to the modular structure 1.

The modular structure 1 also comprises a longitudinal cross-piece 36 comprising:
- at least a fourth metal section 37 having a cross section higher than its width and comprising one pair of extreme portions 38 associable with one of the vertical uprights 2, respectively; and
- at least one reinforcing bracket 39 comprising an interlocking portion 40 of one of the extreme portions 38 and a plurality of fifth clamping elements 41 arranged protruding and superimposed on one another.

The fifth clamping elements 41 are spaced apart from one another and configured to be coupled in block configuration to engage, from top to bottom, a plurality of first teeth 3 along the first interlocking plane A.

Preferably, the fourth metal section 37 is a tube with a rectangular section whose shape is substantially equal to that of the first metal section 4, but the dimensions of which are substantially larger than the first metal section 4.

Moreover, the reinforcing bracket 39 comprises a first pair of first longitudinal sides 42, parallel and opposite to each other, and a second longitudinal side 43 associated contiguously and substantially orthogonally to the first longitudinal sides 42 to form an angle of 90° with each of them.

Advantageously, the reinforcing bracket 39 comprises a plurality of pairs of fifth clamping elements 41 arranged longitudinally along one of the first longitudinal sides 42.

This way, the attachment of the reinforcing bracket 39 to the vertical upright 2 is obtained with more than one pair of attachment points in order to increase the capacity of the reinforcing bracket 39 which must support the fourth metal section 37.

In addition, when the fifth clamping elements 41 are coupled to the corresponding first teeth 3, the second longitudinal side 43 is facing in support the second vertical face 9 of the vertical upright 2, to further increase the capacity of the reinforcing bracket 39.

In fact, the second longitudinal side 43 is of substantially the same height with respect to the first longitudinal sides 42 and it unloads part of the load applied onto the reinforcing bracket 39 on the second vertical face 9 in such a way as to lighten the load applied on the first teeth 3.

Preferably, the interlocking portion 40 comprises a pair of flat members, substantially parallel and opposed to each other, respectively associated with the first longitudinal sides 42 and comprising respective metal projections adapted to attach to the fourth metal section 37.

Advantageously, the fourth metal section 37 comprises a pair of inserts which are obtained substantially opposed and parallel to each other at each extreme portion 38.

Furthermore, the flat members have substantially lower height than the height of the cross section of the fourth metal section 37 so as to fit inside an extreme portion 38.

Specifically, when the flat members are fitted into the fourth metal section 37, the metal projections are interlocked inside the corresponding recesses.

In addition, the metal projections undergo a cold deformation process to rivet the interlocking portion 40 to the extreme portion 38 so as to realize interlocking between the reinforcing bracket 39 and the fourth metal section 37.

The cold riveting process grants an appreciable aesthetic appearance to the interlocking between the reinforcing bracket 39 and the fourth metal section 37, unlike traditional hot riveting and/or welding processes.

The modular structure 1 also comprises at least one anti-shock base 44 for supporting the vertical metal section 7 on a stable support surface, comprising:
- at least one pair of vertical stretches 45, each one provided with one pair of sixth clamping elements 46 arranged protruding and superimposed on one another;
- at least a first support portion 47 resting on the stable support surface when the pairs of sixth clamping elements 46 are coupled to one pair of first teeth 3 respectively; and
- first connecting means 48 for connecting the anti-shock base 44 to the vertical metal section 7.

The sixth clamping elements 46 of each pair of vertical stretches 45 are spaced apart from one another so as to be coupled in block configuration to engage, from top to bottom, any pair of the first teeth 3 along the first interlocking plane A.

Preferably, the anti-shock base 44 is a metal foil comprising a pair of auxiliary vertical stretches 49 substantially parallel and opposed to each other and associated respectively contiguously and substantially orthogonally to the vertical stretches 45, to form two angles of 90° with the latter, respectively.

This way, when the sixth clamping elements 46 are attached to the corresponding first teeth 3 and the vertical stretches 45 are restingly facing the first vertical faces 8 of the vertical metal section 7, the auxiliary vertical stretches are restingly facing the second vertical faces 9.

Advantageously, the first connecting means 48 comprise four first openings, obtained on the auxiliary vertical stretches 49, a plurality of screws and a plurality of nuts which can be tightened to the corresponding screws to connect the second holes of the second vertical faces 9 to the first openings of the anti-shock base 44.

Specifically, each screw passes through a pair of first openings, through a pair of second holes and is fixed by means of a corresponding nut.

The distance between two first openings on the same auxiliary stretch 49 is substantially identical to the distance between two second holes on the same second vertical face 9, so as to face the pairs of first openings with the pairs of second holes, substantially concentric with each other.

The operation of the invention is as follows.

The modular structure 1 allows manufacturing various types of shelving using the elements described.

Specifically, the modular structure 1 rests on the stable support surface by using a plurality of vertical uprights 2 attached to each other in a stable manner by means of a plurality of first metal sections 4 and a plurality of first bracing elements 10, as shown in FIG. 1.

Conveniently, the modular structure 1 envisages the use of a plurality of first angular brackets 14 and a plurality of second angular brackets 20 combined with each other such that one or more angular shelving are obtained, i.e. shelving the support surface of which is composed of two flat support portions arranged contiguously and substantially orthogonal to each other to define an angle of 90°.

The first angular bracket 14 allows arranging a first metal section 4 along the second interlocking plane B and the second angular bracket 20 allows arranging another first metal section 4 along the third interlocking plane C, so as to make an angular shelving as shown in FIG. 6.

Specifically, a first metal section 4 is attached to the vertical upright 2 along the first interlocking plane A, by coupling a pair of first teeth 3 and a pair of first clamping elements 6.

A second angular bracket 20 is attached to the first metal section 4, to which another first metal section 4 is attached. The first attachment occurs via the attachment means 21, the second attachment occurs via the third teeth 22 and the first clamping elements 6.

A first angular bracket 14 is attached to the vertical upright 2, to which is attached an additional first metal section 4. The first attachment occurs via the coupling between another pair of first teeth 3 and a pair of second clamping elements 16, the second attachment occurs via a pair of second teeth 18 and another pair of first clamping elements 6.

In particular, the two pairs of first teeth 3 used to make the angular shelving are arranged substantially at the same height, i.e. they are arranged on the two first vertical faces 8 of the vertical upright 2 respectively such that the first metal sections 4 are substantially arranged at the same height.

Advantageously, with the first clamping elements 6 attached to the second teeth 18, the first tab 67 is manually rotated by a user around the weakened rectilinear line of the first angular bracket 14 until it is arranged coplanar to the interlocking plane B.

The first tab 67 is arranged exactly along the path that the first lower clamping element 6 must travel to release from the corresponding second tooth 18.

This way, the first tab 67 prevents the first metal section 4 from being released from the first angular bracket 14.

What has just been described with reference to the first angular bracket 14 also applies to the second angular bracket 20, in which the second tab 68 is arranged coplanar to the third interlocking plane C to prevent the first clamping elements 6 from being released from the third teeth 22.

Advantageously, the modular structure 1 envisages using a plurality of sliding supports 24.

A first sliding support 24 is attached to a first pair of vertical uprights 2 by means of a pair of attachment brackets 26.

For each bracket 26 and upright 2, the attachment occurs by coupling a pair of third clamping elements 28 to a pair of first teeth 3, so as to arrange the fixed element 25 and the sliding element 30 in a stable position and substantially orthogonal to the two uprights 2.

Likewise, another sliding support 24 is attached to another pair of vertical uprights 2 substantially parallel and opposed to the first sliding support 24.

The modular structure constructed in this way allows associating a supporting member 31, such as e.g. a drawer, between the two sliding supports 24.

In addition, it is possible to manufacture a modular structure 1 comprising a plurality of sliding drawers arranged one on top of the other at different heights along the vertical uprights 2 thereby forming a drawer unit.

The modular structure according to the invention also makes it possible to increase the stability and capacity of the shelving as need may be.

Conveniently, it is possible to attach a plurality of stabilizing bars 32 between two vertical uprights 2, where the attachment occurs between a plurality of fourth clamping elements 35 and a plurality of first teeth 3 respectively.

This way, the stabilizing bar 32 attaches a wider portion of the two vertical uprights 2 with respect to the portion attached by a first metal section 4 and gives the structure greater stability.

A further solution which allows increasing the stability and the capacity of the modular structure 1 consists in using a plurality of longitudinal cross-pieces 36.

Advantageously, the fourth metal sections 37 are interposed between a pair of vertical uprights 2 to form a support frame 1 whereon it is possible to attach a plurality of supporting planes, for example, similarly to what described for the first metal sections 4.

In particular, the two extreme portions 38 of a fourth metal section 37 are attached to respective reinforcing brackets 39 which are attached to the corresponding vertical uprights 2.

The first attachment occurs by means of a cold riveting process, whereas the second attachment occurs between a plurality of fifth clamping elements 41 and a plurality of first teeth 3.

The modular structure 1 thus obtained ensures capacity and further stability, since the dimensions of the fourth metal sections 37 and the shape of the reinforcing brackets 39 allow manufacturing a plurality of supporting surfaces capable of bearing greater loads than those supporting surfaces obtained through the first metal sections 4.

A further solution for increasing stability consists in attaching an anti-shock base 44 to the terminal portion of each vertical upright 2.

This way, the anti-shock bases increase the support base of the uprights 2 relative to the stable support surface 2 as well as stability of the modular structure 1.

Figure 9:
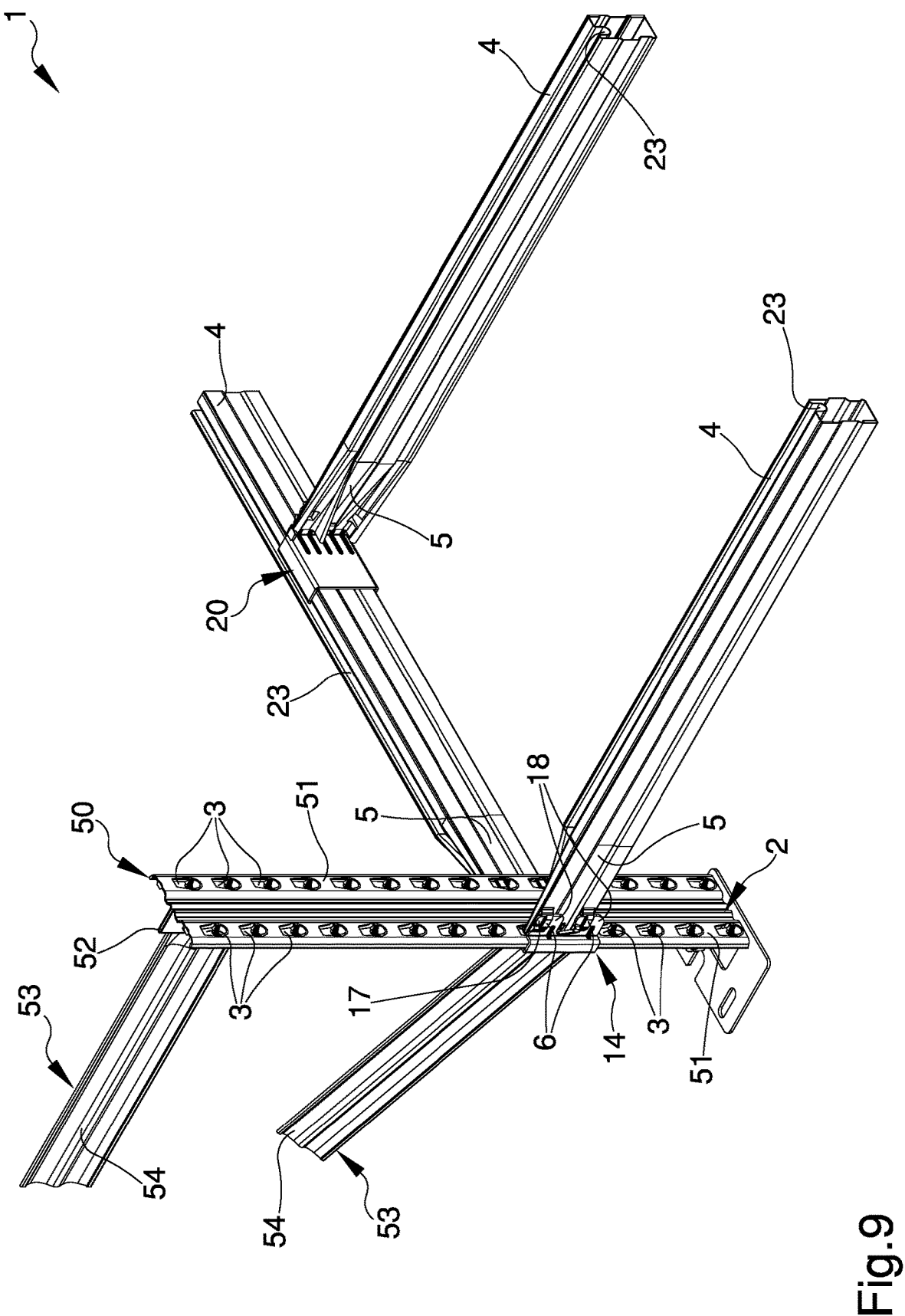
FIG. 9 is an axonometric view of a second embodiment of the modular structure according to the invention.
Figure 16:
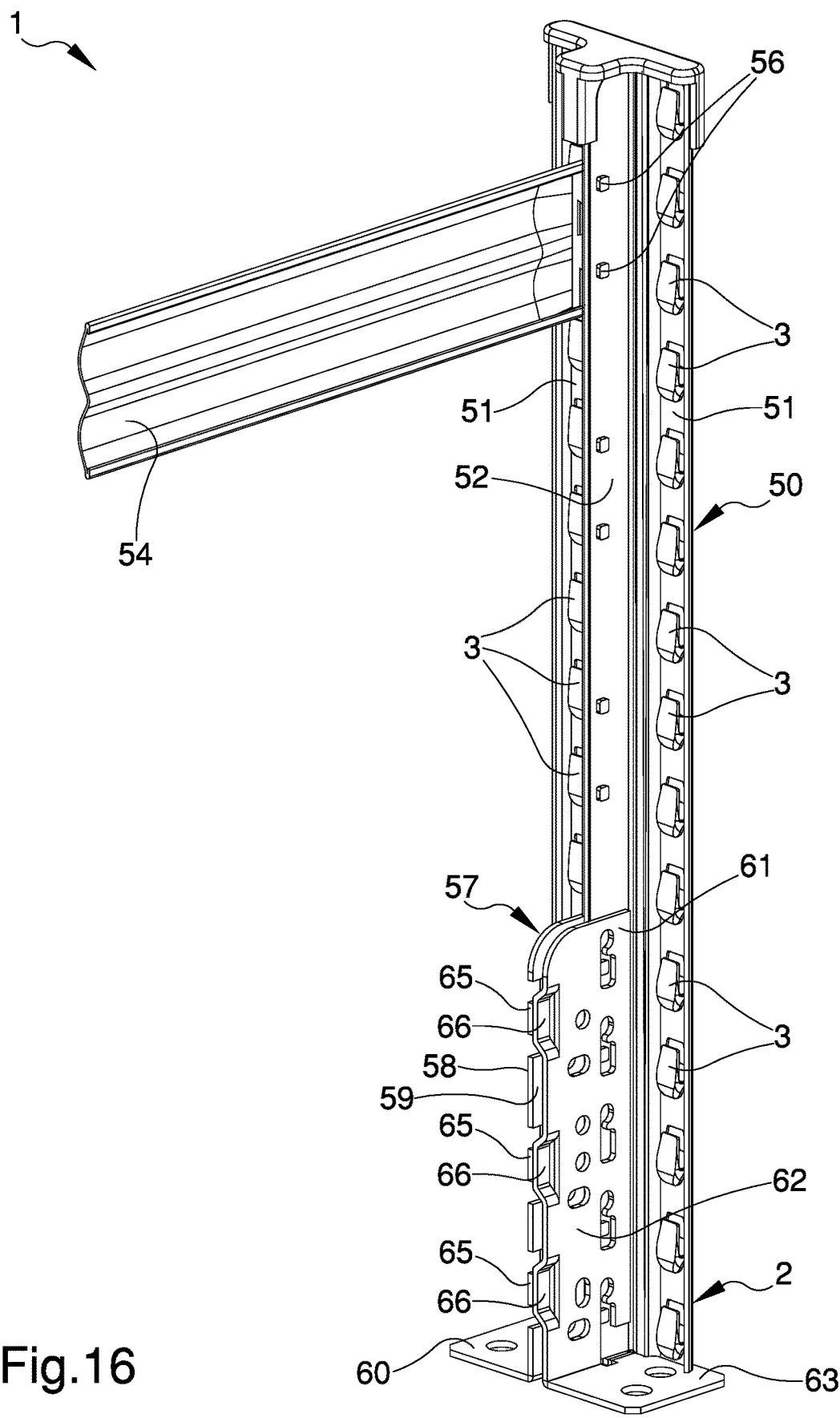
FIG. 16 is an axonometric view of a second portion of the second embodiment of the modular structure according to the invention.

A second embodiment of the modular structure 1 is shown in FIG. 9.

The vertical upright 2 comprises a vertical metal foil 50 provided with at least one pair of first vertical surfaces 51 and with at least a second vertical surface 52 substantially transverse to the pair of first vertical surfaces 51, at least one pair of the first teeth 3 being arranged vertically along at least one of the first vertical surfaces 51.

Preferably, the vertical upright 2 is substantially a metal foil folded longitudinally on itself, wherein the second vertical surface 52 is associated, contiguously and substantially orthogonally, to the two first vertical surfaces 51.

The first surfaces 51 are arranged substantially coplanar to each other and, concurrently with the second surface 52, give the metal foil 50 a substantially T-shaped cross section. Furthermore, on each first vertical surface 51 a plurality of pairs of first teeth 3 is obtained, as shown in FIG. 9. This way, a plurality of first metal sections 4 can be attached to each first vertical surface 51.

In particular, each first ending part 5 of each first metal section 4 is attached to a corresponding first vertical surface 51 to form a junction crosspiece between two vertical uprights 2.

Furthermore, the modular structure 1 comprises:
- at least a second bracing element 53 provided with at least a substantially flat longitudinal metal foil 54 and comprising at least one cross section higher than its width and at least one pair of attachment ending parts 55 to be attached to the vertical metal foil 50; and
- second fastening means 56 of the attachment ending part 55 to the second vertical surface 52.

Preferably, the second bracing element 53 is a metal foil the attachment ending parts 55 of which are substantially flat, so as to restingly face the second vertical surface 52 and to become attached onto the vertical upright 2 through the second fastening means 56.

Conveniently, the second fastening means 56 comprise a plurality of pairs of pins, sequentially one on top of the other along both faces of the second vertical surface 52, and a pair of cavities obtained on each attachment ending part 55 of the bracing element 53.

Specifically, a first pair of pins formed on one face of the second vertical surface 52 corresponds to a second pair of substantially opposed pins and formed on the other face of the second vertical surface 52.

The distance between the pins of a pair made on the second vertical surface 52 is substantially equal to the distance between the cavities of a pair obtained on an attachment ending part 55.

This way, the pair of pins can interlock inside the cavity pair respectively to firmly attach a second bracing element 53 to a vertical upright 2.

In particular, the second bracing element 53 is arranged attached between two uprights 2, substantially transverse to the first interlocking planes A to form a junction crosspiece which, concurrently with the cross members formed by the first metal sections 4, makes a modular structure according to the invention.

The modular structure 1 also comprises at least one support base 57 for supporting the vertical metal foil 50 on a stable support surface, comprising:
- a first element 58 comprising a first longitudinal body 59 to be attached to the second vertical surface 52 and a first supporting surface 60 associated with the first longitudinal body 59 and adapted to rest on the stable support surface;
- a second element 61 comprising a second longitudinal body 62 to be attached to the second vertical surface 52 and a second supporting surface 63 associated with the second longitudinal body 62 and adapted to rest on the stable support surface;
- second connecting means 64 of at least one of the first longitudinal body 59 and the second longitudinal body 62 to the second vertical surface 52.

The two supporting surfaces 60 and 63 rest on the stable support surface when the two longitudinal bodies 59 and 62 are connected to the second vertical surface 52.

Preferably, the first longitudinal body 59 and the first supporting body are of a substantially flat shape, the longitudinal body 59 being associated contiguous and substantially orthogonal to the first supporting surface 60 to form an angle of 90° therewith and give the first element 58 a cross section with a substantially "L" shape.

The second longitudinal body 62 and the second supporting body 63 are also of a substantially flat shape, the longitudinal body 62 being associated contiguous and substantially orthogonal to the second supporting surface 63 to form an angle of 90° therewith and give to the second element 61 a cross section with a substantially "L" shape.

Advantageously, the first element 58 and the second element 61 have substantially identical shape and dimensions.

Preferably, the second connecting means 64 comprise a plurality of second openings formed longitudinally one on top of the other along the first longitudinal body 59 and the second longitudinal body 62.

Specifically, the distance between two second openings made on the first longitudinal body 59 is equal to the distance between two second openings made on the second longitudinal body 62 and also to the distance between two pins of the same pair made on the second vertical surface 52.

Moreover, to each second opening formed on the first longitudinal body 59 corresponds a second opening made opposed and parallel onto the second longitudinal body 62.

This way, the first longitudinal body 59 and the second longitudinal body 62 are attached to the respective faces of the second vertical surface 52 substantially at the same height, so as to arrange the first supporting surface 60 substantially coplanar to the second supporting surface 63.

Advantageously, the first longitudinal body 59 and the second longitudinal body 62 are clamped through the pair of pins arranged at the ending part of the vertical upright 2 to rest against the stable supporting surface.

FIGS. 17 and 18 show a different embodiment of the two longitudinal bodies 59 and 62 which allows the use of the support base 57 also for the first embodiment of the modular structure 1.

The first longitudinal body 59 comprises a plurality of sixth teeth 65 arranged in sequence one on top of the other, the second longitudinal body 62 comprises a plurality of seventh clamping elements 66 arranged protruding, superimposed on one another and spaced apart from one another to be coupled in block configuration to engage the sixth teeth 65.

The first longitudinal body 59 and the second longitudinal body 62 form, therefore, a single body which can be attached to the pair of second vertical faces 9 through the second connecting means 64.

The supporting surfaces 60 and 63 rest on the stable support surface when the sixth teeth 65 are coupled to the seventh clamping elements 66.

Preferably, the sixth teeth 65 are metal foil portions of a substantially flat trapezoidal shape and formed from the same foil with which the first longitudinal body 59 is made.

Advantageously, the seventh clamping elements 66 are metal foil portions formed substantially from the same foil with which the second longitudinal body 62 is made and of a shape substantially equal to the first clamping elements 6 so as to form a plurality of loops to be coupled by interlocking with the sixth teeth 65.

Specifically, each sixth tooth 65 formed on the first longitudinal body 59 corresponds to a seventh clamping element 66, substantially opposite the sixth tooth 65, formed on the second longitudinal body 62.

In addition, when the sixth teeth 65 are coupled with the seventh clamping elements 66, the two longitudinal bodies 59 and 62 are arranged restingly facing each other to form a single longitudinal body, while the two supporting surfaces 60 and 63 are arranged substantially coplanar to each other, thereby forming a single supporting body substantially orthogonal to the two longitudinal bodies 59 and 62.

The first longitudinal body 59 and the second longitudinal body 62 are fitted inside the vertical metal section 7, while the sixth teeth 65 and the seventh clamping elements 66 are arranged in proximity of the second vertical faces 9 outside the vertical metal section 7.

Conveniently, the second connecting means 64 comprise a plurality of screws, passing through a pair of second holes and a pair of second openings, and a plurality of nuts, which can be tightened to the respective screws to lock the two longitudinal bodies 59 and 62 between the second vertical faces 9 of the vertical metal section 7.

The operation of the second embodiment just described is substantially identical to that of the first embodiment.

Both the embodiments of the modular structure according to the invention can employ a plurality of first angular brackets 14, a plurality of second angular brackets 20, a plurality of sliding supports 24, a plurality of stabilizing bars 32 and a plurality of longitudinal cross-pieces 36.

It has in practice been found that the described invention achieves the intended objects.

In particular, the use of angular brackets makes it possible to obtain angular shelving easily accessible and particularly stable.

In addition, the use of sliding supports allows manufacturing modular structures provided with drawer units or sliding containers, as an alternative to the known static shelving.

In addition, the use of stabilizing bars allows increasing in a targeted manner the capacity and stability of the shelving, which is obtainable due to the modular structure according to the invention, as a function of the load.

In addition, the use of longitudinal cross-pieces allows manufacturing modular structures with high capacity and stability as well as particularly long shelving than those of a known type.

Finally, the various embodiments described provide extreme flexibility to the modular structure according to the invention making it usable for a variety of application fields.

The invention claimed is:

1. A modular structure for shelving, wherein said modular structure comprises:
   a plurality of vertical uprights comprising gat least one pair of first teeth arranged one on top of the other to define a first interlocking plane;
   a plurality of first metal sections provided with a cross section, higher than a width of said plurality of first metal sections, being of substantially tubular and parallelepiped shape, and with two ending parts provided with corners and with one pair of first clamping elements, arranged protruding in proximity of said corners and superimposed on one another;
   said first clamping elements being spaced apart from one another to be coupled from top to bottom and iii block configuration to any pair of said first teeth along said first interlocking plane, each said first clamping element comprising a loop defining a passage slot and each of said ending parts of said first metal sections being substantially flat,
   wherein said modular structure comprises at least a first angular bracket comprising:
   at least a first flat terminal portion comprising one pair of second clamping elements arranged protruding and superimposed on one another, spaced apart from one another to be coupled from top to bottom and in block configuration to any pair of said first teeth along said first interlocking plane; and
   at least a second flat terminal portion comprising one pair of second teeth arranged one on top of the other to define a second interlocking plane substantially orthogonal to said first interlocking plane;
   wherein said first clamping elements are configured to be coupled from top to bottom and in block configuration to any pair of said second teeth along said second interlocking plane.

2. The modular structure according claim 1, wherein said modular structure comprises at least a second angular bracket comprising:
   attachment means to a respective one of said first metal sections, sliding longitudinally along the respective one of said first metal sections; and
   one pair of third teeth arranged one on top of the other to define a third interlocking plane substantially orthogonal to said first interlocking plane,
   wherein said first clamping elements are configured to be coupled from top to bottom and in block configuration to any pair of said third teeth along said third interlocking plane.

3. The modular structure according to claim 1, wherein said modular structure comprises at least one sliding support comprising:
   at least one fixed element;
   at least one pair of attachment brackets of said fixed element to a corresponding pair of said plurality of vertical uprights and comprising at least one flat terminal body provided with at least one pair of third clamping elements arranged protruding and superimposed on one another, spaced apart from one another to be coupled from top to bottom in block configuration to any pair of said first teeth along said first interlocking plane;
   clamping means of said fixed element to said attachment brackets; and
   at least one sliding element hinged sliding longitudinally to said fixed element and associable with at least one supporting member.

4. The modular structure according to claim 1, wherein each of said plurality of vertical uprights comprises a vertical metal section provided with at least one pair of first vertical faces and with at least one pair of second vertical faces substantially transverse to said pair of first vertical faces, at least one pair of said first teeth being arranged vertically along at least one of said first vertical faces.

5. The modular structure according to claim 1, wherein each of said plurality of vertical uprights comprises a vertical metal foil provided with at least one pair of first vertical surfaces and with at least a second vertical surface substantially transverse to said pair of first vertical surfaces, at least one pair of said first teeth being arranged vertically along at least one of said first vertical surfaces.

* * * * *